United States Patent [19]

Wahlbeck

[11] 4,000,627
[45] Jan. 4, 1977

[54] PENDANT JEWEL CHAIN
[76] Inventor: Hans Gustav Erik Wahlbeck, Nybble, 150 32, Stallarholmen, Sweden
[22] Filed: Nov. 11, 1974
[21] Appl. No.: 522,876
[30] Foreign Application Priority Data
Nov. 16, 1973 Sweden .............................. 7315541
Jan. 24, 1974 Sweden .............................. 7400918
[52] U.S. Cl. ........................................ 63/2; 59/93; 24/230.5 R
[51] Int. Cl.² ........................................ A44C 25/00
[58] Field of Search ............ 63/2, 21, 3, 4; 24/231, 24/237, 265 CC, 265 SH, 230.5 CR, 201 BN; 59/93, 78

[56] References Cited
UNITED STATES PATENTS

| | | | |
|---|---|---|---|
| 301,661 | 7/1884 | Becker | 59/80 |
| 365,853 | 7/1887 | Palmer | 63/4 UX |
| 375,045 | 12/1887 | Breul | 24/234 UX |
| 804,273 | 11/1905 | Smith | 24/231 |
| 835,421 | 11/1906 | Heidt | 59/93 X |
| 1,194,611 | 8/1916 | Fishel | 63/4 |
| 1,219,683 | 3/1917 | Wachenheimer et al. | 63/4 UX |
| 1,296,718 | 3/1919 | Vaughan | 59/93 X |
| 1,567,851 | 12/1925 | Lorber | 24/237 |
| 1,841,423 | 1/1932 | Wells | 24/237 |
| 1,843,555 | 2/1932 | Goldblatt | 63/4 |
| 3,079,657 | 3/1963 | Russell | 24/237 X |
| 3,412,576 | 11/1968 | Hodge | 63/4 |

FOREIGN PATENTS OR APPLICATIONS

| | | | |
|---|---|---|---|
| 794,729 | 12/1935 | France | 24/239 |
| 1,085,533 | 7/1954 | France | 24/239 |

Primary Examiner—F. Barry Shay
Attorney, Agent, or Firm—Larson, Taylor and Hinds

[57] ABSTRACT

A pendant jewel chain is provided which includes a conventional link chain, a clasp means in the form of a spring ring and a connection member, including first and second parts, disposed between the spring ring and the outermost link of the jewel chain. The first part of the connection member is disposed adjacent the spring ring and is of large size so to permit attachment thereof to the spring ring. The second part is disposed adjacent to the chain and is of small enough size to be inserted into the outermost chain link. The two parts are rigidly connected to one another and the second part is freely deflectable so as enable insertion of a chain link therein.

2 Claims, 18 Drawing Figures

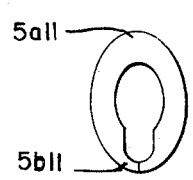 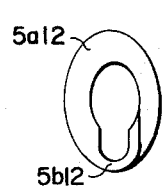 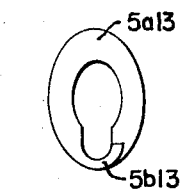 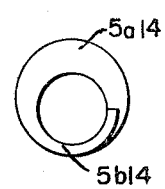
FIG. 4a  FIG. 4b  FIG. 4c  FIG. 4d
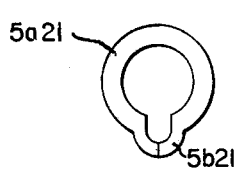 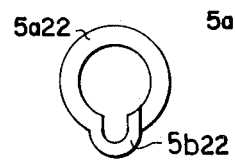 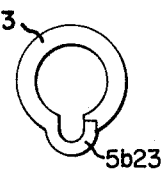 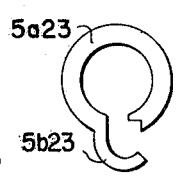
FIG. 5a  FIG. 5b  FIG. 5c  FIG. 5d
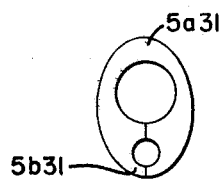 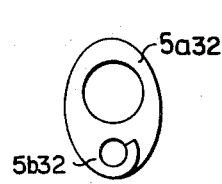 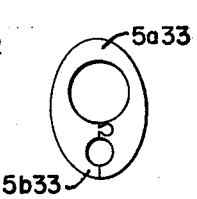 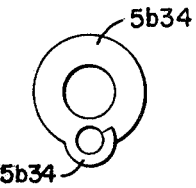
FIG. 6a  FIG. 6b  FIG. 6c  FIG. 6d
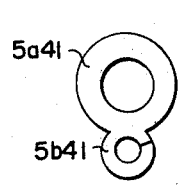 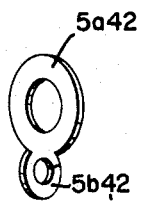 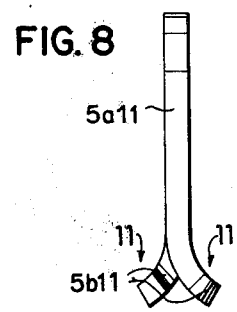
FIG. 7a$_1$  FIG. 7a$_2$  FIG. 8

PENDANT JEWEL CHAIN

The present invention concerns a pendant jewel chain of type comprising a chain of links at one end having a spring ring and at the opposite end a connection ring which may be moved into locking engagement with the spring ring. In previously known pendant jewel chains of this kind the connection ring is usually soldered on the outermost link of the chain, and likewise the connection ring of the spring ring is usually soldered on the outermost link at the opposite end of the chain. Such an arrangement of chain and connection rings however involves certain disadvantages. When soldering the connection ring on the outermost link of the chain the solder generally flows out over several links at the end of the chain so that said links are soldered together into a stiff unit. This phenomena is in particular apt to occur with thin chains, where capillary forces tend to cause an increase of the number of links soldered together and where there are further difficulties in providing local solderings due to the small dimensions. The chains are usually manufactured in running lengths and in connection with the manufacture thereof the chains are ground and polished in order to remove all unevenesses and to give the chains a smooth surface. If now a connection ring is soldered at the end of a chain which has been ground and polished, at least some parts of the chain are subjected to a heating so that the surface of the chain at some places is tarnished. This is especially noticeable at so called diamond ground chains, where the grinding is made so as to provide light reflecting facets. A chain having a connection ring soldered thereon may further cause problems when mounting a jewel having a small chain hole since in such case the chain often has to be cut off and a new connection ring has to be soldered on the chain after this has been pulled through the said hole of the jewel. There is the same problem if the chain has to be shortened since this is only possible by cutting the chain and soldering a new connection ring.

The basis of the invention therefore is the problem of providing a pendant jewel chain in which it is possible to avoid a soldering together of links at the ends of the chain, which may easily be hooked onto connection holes of the jewel (even small ones), in which the chain easily and without subsequent solderings may be shortened to any wanted length, in which the smooth surface provided in connection to the manufacture of the chain is not made tarnished and in which the pendant jewel chain may further be manufactured in a more simple and quicker way than previously, and which chain is further more easy to clasp than previous pendant chains which often have very small and thin connection rings.

The pendant jewel chain according to the invention comprises a link chain having a connection means at each end thereof and a conventional spring ring or similar clasp means, whereby each connection means includes a relatively large control mark loop and a connection ring connected with said control mark loop and in which the outermost link of the chain is hooked on, and whereby the connection ring, without affecting the connection ring itself or the chain, may easily be opened and closed.

The pendant jewel chain according to the invention is advantageous in several respects as compared with previously known pendant jewel chain where the chain and the connection ring are generally soldered together. Since the chain without soldering and the associated heating is hooked on the connection ring it is possible to avoid the oxidation and the tarnishing which will otherwise occur, and it is further possible to overcome the previous disadvantage that the solder by means of which the chain is soldered on the connection ring flows out and is absorbed by the outermost links of the chain thereby making same stiff. Further, the chain may, by simply means and without using any special tools, be hooked on the connection ring and may be shortened if necessary. Further, by suitably dimensioning the connection ring in relation to the chain it is possible to foresee that the connection ring, in case of overloading of the chain, opens at a force which is less than the critical force for the chain, whereby it is avoided that the chain is broken. On the contrary the connection ring opens and after hooking the chain onto the connection ring the latter may easily be closed.

The invention will now be described more in detail with reference to the accompanying drawings in which FIG. 1 shows a part of the clasped ends of a pendant jewel chain according to the invention and FIG. 2 shows the pendant chain of FIG. 1 seen in a view at right angle of that according to FIG. 1.

FIGS. 4, 5, 6 and 7 show a number of alternative embodiments of the control mark loop having a connection ring part, and FIG. 8 finally shows a schematical side view of how to open such a connection ring part for mounting the chain.

Figure 1:
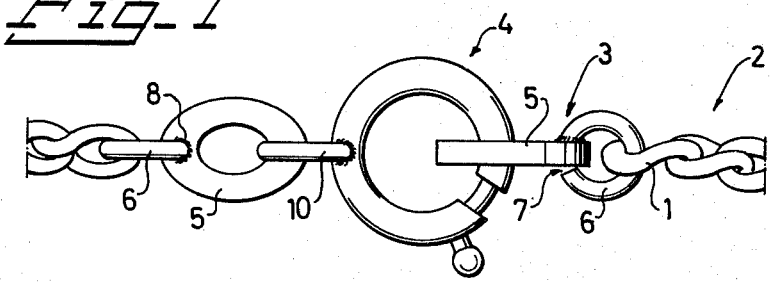

Referring to FIG. 1 there is shown a pendant jewel chain comprising a chain 2 of conventional kind having links 1. At each end the chain has a characteristic connection means 3 and in one of said connection means a conventional spring ring 4 is mounted.

Each connection means 3 comprises a control mark loop 5 and a connection ring 6 forming a part thereof. The control mark loop 5 is made in one piece and is preferably punched out of a plate of suitable thickness. Preferably the control mark loop is of elliptical form. The connection ring 6 is circular, elliptical or of any other form and may be made of a flat rolled wire. Ring 6 is formed so that the two ends thereof leave a gap 7 into which the control mark loop 5 may be moved. The connection ring 6 has one end 8 soldered onto one planar surface of the control mark loop 5, while the opposite end 9 of the connection ring 6 is unattached, end 9 resting against or adjacent the opposite planar surface of the control mark loop 5. By this arrangement the connection ring 6 may, upon demand, be opened in a simple way so that the outermost link 1 of the chain may be put on said end 9 of the connection ring 6 and said ring may be then forced together again, so that the chain is secured against the connection ring. In order to give the connection ring a strong bending resistance it may as mentioned above be made flat rolled.

One of the connection means 3 is provided with a conventional spring ring 4, and the control mark ring 5 is moved into a mounting loop 10 of the spring ring, whereupon the said mounting loop 10 is soldered on the spring ring. The connection means formed by the control mark loop 5 and the connection ring 6 is manufactured as a separate unit, and the mounting loop 10 is soldered on the spring ring before the chain 2 is mounted, and no heating and resulting tarnishing of the chain is necessary, and the links of the chain are not soldered together to a stiff unit.

Figure 2:
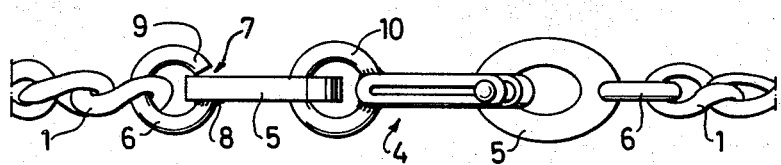

In the embodiment shown in FIGS. 1 and 2 one end of the connection ring 6 is soldered or in any other way mounted on the control mark loop while the opposite end thereof loosely engages the opposite side of the control mark loop. The soldering of the connection ring on the control mark loop involves an amount of work which is relatively costly and time consuming and according to a further aspect of the invention it is intended to avoid the said soldering operation.

Therefore according to a further aspect of the invention the connection ring is formed as an integral part of the control mark loop or alternatively a control mark loop is formed so that some part thereof corresponds to the connection ring. Also in this embodiment of the invention the connection ring or the connection ring part may easily be opened and closed without soldering and without using special tools, so that the chain may easily and quickly be hooked on and removed respectively. Except for the above mentioned advantage of avoiding time and cost consuming soldering operations this embodiment of the invention also is advantageous in that the number of parts included in the pendant jewel chain is reduced, that the catch and connection means of the chain is shortened and that a softer and more easily handled pendant jewel chain is obtained than what has previously been possible. By the invention it has been possible to reduce the number of parts included in the pendant jewel chain to a minimum. The control mark loop and the connection ring formed as an integral unit are used for both ends of the chain irrespective of the fact that the control mark loop is at one end connected to the spring ring while at the other end it forms the detachable connection means by which the chain is normally opened and closed. The control mark loop thereby forms a necessary part of the pendant jewel chain except that the control mark loop is used for manufacture, silver or gold stampings.

Figure 3:
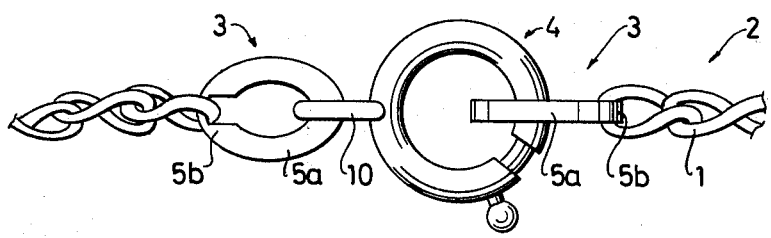
FIG. 3 shows a part of a modified embodiment of a pendant jewel chain according to the invention.

In FIG. 3 is shown a pendant jewel chain according to the invention comprising a chain 2 of links 1 which at one end has a connection means 3 which as usual may be detachably connected with a spring ring 4. The opposite end of the pendant jewel chain is mounted, through means of a releasible connection means, in a mounting loop 10 which, is soldered on the spring ring 4. The connection means 3 is a solid unit including a control loop part 5a and a connection ring part 5b, which is affixed to the control ring part and is made as an integral part thereof. The control loop with the connection ring part is preferably manufactured by punching the same out of flat rolled plate and it may be given any suitable form, but usually it is made elliptical, circular or twin-circular.

In FIGS. 4–7 a number of different embodiments are shown which are all similar in the respect that the control loop part 5a and a connection ring part 5b are punched out of one and the same plate blank and that the connection ring part forms an integral part of the control mark loop. In all embodiments the connection ring part may be easily opened so that the outermost link of the chain may be hooked on whereupon the connection ring part may easily be closed without soldering and without using any special tools. In each embodiment, a simple speit ring is provided, there being no overlapping of adjacent surfaces.

The most simple embodiment is shown in FIG. 4a, and in this case the joint of the connection ring part is, like in the embodiments according to FIGS. 5a and 6a, located in line with the major axis of the ellipse, i.e. in line with the connection point of the chain link. Since the control loop part 5a11 is substantially wider than the connection ring part 5b11 the joint of the connection ring part 5b11 is opened substantially only by a bending outwards of the branches of the connection ring part in case of overload. As best shown in FIG. 8 the opening of the connection ring part for hooking on the chain in however, is suitably effected by bending the branches of the connection ring part 5b11 at opposite sides in a plane at right angle of the drawing, and after the chain is hooked on, said branches are turned back as shown with the arrows 11.

The connection ring part may also be made as shown in FIG. 5d, whereby the connection ring part 5b23 at the punching out thereof forms a little gap against the control loop part 5a23 and in this case the chain may be hooked on without bending out or open the branches of the connection ring part. The locking of the connection ring part 5b23 to the control loop part 5a is provided by bending the connection ring part 5b23 inwards against the control loop part as shown in FIG. 5c. This bending is preferably made in mechanical way by means of suitable tools or machines.

In order to make it possible to hook on thin chains and in order to form a weakened point, which in case of overloading, opens, the inner bore of the connection ring is, in the embodiment according to FIG. 6, made separately aside of the bore of the control loop part or has a bulge of the control loop part as shown in FIGS. 4 and 5 or so that the bores of the control loop part and the connection ring part are formed circularly and in common as shown in FIG. 4d. If the connection rings are made of a thin material or if they are intended to provide a strong resistance to opening one branch of the connection ring part may be formed as a tongue projecting into the control loop part and which is prevented from opening by the action of the corresponding branch of the control loop part. Such embodiments of the invention are shown e.g. in FIGS. 4b, c, d and 5b and 5c. In FIG. 6c an additional strengthening is provided in that the web between the holes of the control loop part and the connection ring part is formed with a keyhole lock which may easily be opened by moving the two branches at different sides and which in the locked condition makes an opening of the connection ring part more difficult. FIGS. 7a₁ and 7a₂ substantially correspond to each other, but in FIG. 7a₂ the connection ring part 5b42 has been turned an angle, e.g. 90°, in relation to the control loop part 5a42 after the integral unit has been punched out of the plate.

By suitably forming the connection ring 6 or the connection ring part 5b by a suitably thick material the further advantage of the invention may be obtained that the connection ring or the connection ring part, at strong loads, yields for a force which is a little smaller than the force which would otherwise damage or tear off the chain, whereby the connection ring or the connection ring part in such case opens so that the outermost link of the chain is released therefrom. After the outermost link of the chain has been put on the connection ring again this may easily be clamped together, and the pendant jewel chain is prepared. The chain according to the invention involves several advantages. The connection means 3 is manufactured separately and as a unit, and the chain 2 may easily and without soldering be hooked on and removed respectively whether it concerns cutting off the chain to a suitable length or mounting of a pendant jewel having a little chain hole. Since no solderings are made at or close to the chain there is no risk that the chain is damaged due to the soldering heat or by the solder and there is no risk that the links of the chain are soldered together. Thanks to the relatively large control mark loop 5 it is easy to put the chain on, what may cause great problems with prior connection rings which are generally very small and thin. Since further the connection means may be made independently of each other and may be mounted without any other tools but the usual tongs. The pendant jewel chain according to the invention may be manufactured quicker and more simply than has previously been possible. One single soldering operation is necessary for each connection means, and thanks to the relatively large control mark loops a pendant jewel having a little chain hole does not slip off the chain since this is prevented by the control mark loop.

It is to be understood, that the embodiments of the invention described above and shown in the drawings are only illustrative examples and that the invention is not restricted in other sense but by the appended claims.

What we claim is:

1. A pendant jewel chain comprising a link chain part, a connection means mounted thereto at at least one end thereof; and an openable clasp means for providing opening and closure of said pendant jewel chain, characterized in that said connection means is composed of two parts and comprises a first, relatively large control mark loop part connected to the clasp means and a second, connection ring part which forms a unit with the control mark loop part and which is small enough to be connected to the outermost chain link, one end of said connection ring part being rigidly connected to said control mark loop part and another end of said connection ring part being separate from said control mark loop part but in proximate relationship thereto so as to complete the connection ring part through an open connection which permits deflection of said another end of said connection ring part when the forces in tension on said chain part exceed the level which is less than the critical forces required to break the chain part to thereby provide release of said chain part from said connection means, said control loop part including parallel planar side surfaces, one end of said connection ring part projecting from one of said planar side surfaces of said control mark loop part and the opposite end of said connection ring part being disposed adjacent to the opposite planar surface of said control mark loop part.

2. A pendant jewel chain as claimed in claim 1 wherein the free end of said open ring is formed so as to define an open wedge with respect to a planar surface of said control mark loop.

* * * * *